R. SIME.
TRACTION COUPLING DEVICE.
APPLICATION FILED MAY 28, 1919.
1,323,326.
Patented Dec. 2, 1919.
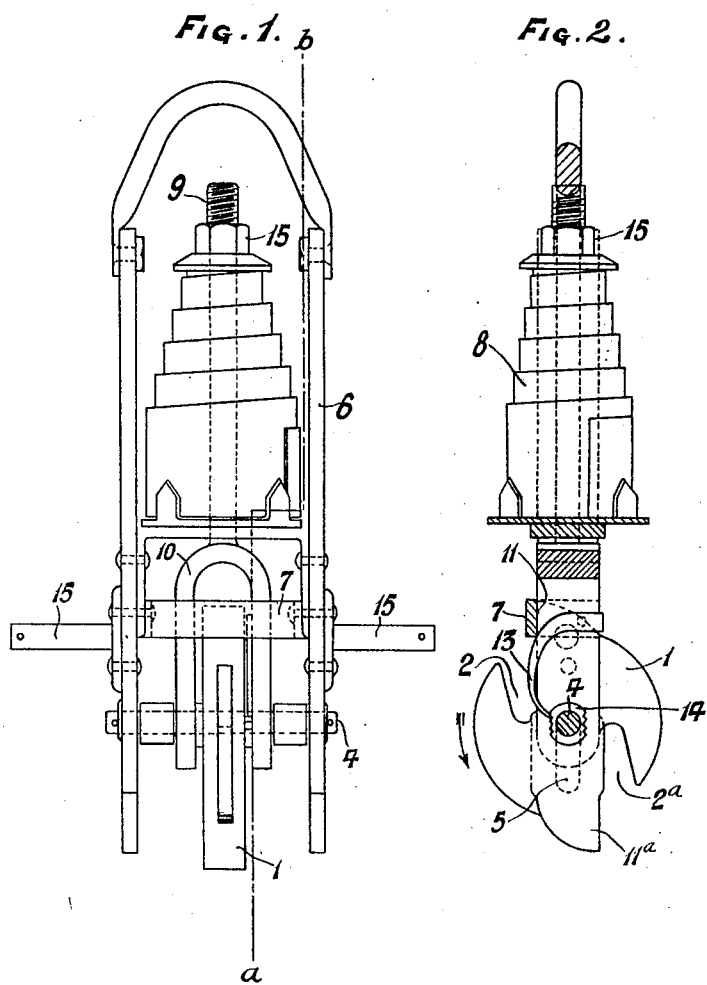

UNITED STATES PATENT OFFICE.

ROBERT SIME, OF ST. ANDREWS, SCOTLAND.

TRACTION-COUPLING DEVICE.

1,323,326.     Specification of Letters Patent.     Patented Dec. 2, 1919.

Application filed May 28, 1919. Serial No. 300,487.

*To all whom it may concern:*

Be it known that I, ROBERT SIME, a subject of the King of the United Kingdom of Great Britain and Ireland, and residing at St. Andrews, Fifeshire, Scotland, have invented a certain new and useful Improvement in Traction-Coupling Devices, of which the following is a specification.

This invention relates to an improved traction coupling device for plows and other agricultural implements, adapted to be uncoupled automatically in the event of the implement meeting with an abnormal obstacle, but capable of being recoupled without necessity for the driver of the tractor to dismount.

The invention is illustrated in the accompanying drawing in which Figure 1 is a plan and Fig. 2 a section on the line $a$—$b$ of Fig. 1.

As shown, the hook element of the coupling device is constituted by a disk 1 having a plurality of notches, in the present instance two notches 2, $2^a$.

The disk 1 is mounted for rotation on a spindle 4 guided in slots 5 in the bifurcated end of the frame 6 which is provided with a detent 7 and is equipped with a spring 8 operatively connected as by a bolt 9 and a link 10 to the spindle 4.

The disk 1 is rotatable in the direction of the arrow (Fig. 2) from one coupling position to another coupling position in which one of the notches, say the notch 2, is presented for concatenation with the haulage cable, the disk being normally prevented from rotation by alternate engagement of substantially radial stops 11, $11^a$ with the detent 7.

The disk 1 is bodily movable relatively to the frame in the direction of pull when the load overcomes the spring 8 into a position such that the stop 11 escapes the detent 7, the disk being then momentarily free to rotate on the spindle 4 so as to unhook the cable. Thereupon the disk is retracted by the spring 7, being now restrained from rotation by engagement of the stop $11^a$ with the detent 7, the notch $2^a$ being now in a position for engagement with the haulage cable.

To prevent reverse rotation of the disk, ratchet- and pawl-mechanism 13, 14 is desirably provided.

The frame 6 is fitted with transversely arranged bars 15 for attachment to the plow or the like.

What I claim is:—

1. In a traction coupling device, in combination, a frame, a spring mounted in said frame, a detent on said frame, and a disk sustained by said frame, said disk having cable-engaging notches and provided with stops successively engageable with said detent, said disk being stepwise rotatable to bring said notches successively into coupling position, and bodily movable in opposition to said spring to clear an engaged stop from said detent and, after performance of a partial rotation, retractable by said spring into a position with the next succeeding stop engaged with said detent.

2. In a traction coupling device, in combination, a frame, a spring mounted in said frame, a detent on said frame, a disk sustained by said frame, said disk having cable-engaging notches and provided with stops successively engageable with said detent, said disk being stepwise rotatable in one direction to bring said notches successively into coupling position, and bodily movable in opposition to said spring to clear an engaged stop from said detent, and, after performance of a partial rotation, retractable by said spring to effect engagement of the next succeeding stop with said detent, and means for preventing reverse rotation of said disk.

3. In a traction coupling device, in combination, a frame, a rotatable coupling element mounted for bodily movement relatively to said frame, yielding means resisting bodily movement of said element, means normally restraining said element against rotation but permitting partial rotation of said element when moved bodily in opposition to said yielding means, and means acting after partial rotation of said element to restrain said element against further rotation until again moved in opposition to said yielding means.

4. In a traction coupling device, in combination, a frame, a coupling element capable of displacement in longitudinal direction between end positions relatively to said frame and also stepwise shiftable in angular direction from one coupling position to another coupling position, means urging said element toward one end position, and an escapement device operative while said element is at said last named end position to retain said element in a coupling position, but adapted to be released on displacement of said element in opposition to said means to permit the angular shift of said element to another coupling position.

In testimony whereof I have signed my name to this specification in the presence of two subscribing witnesses.

ROBERT SIME.

Witnesses:
 KATE FOTHERINGHAM,
 FLORENCE HOUSTON.